Feb. 21, 1928.
C. PARRY ET AL
TEAKETTLE
Filed June 29, 1927
1,660,174
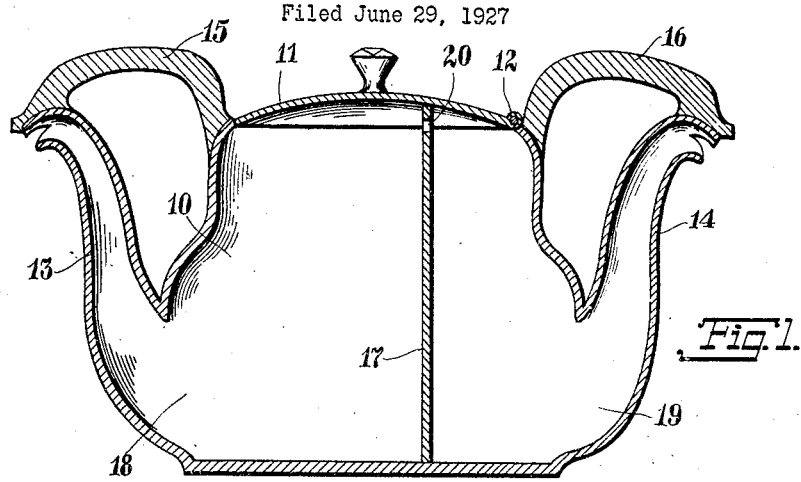
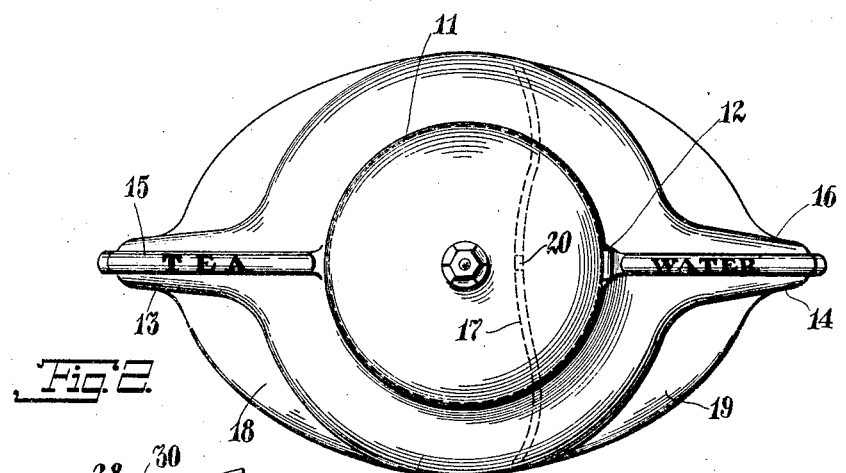
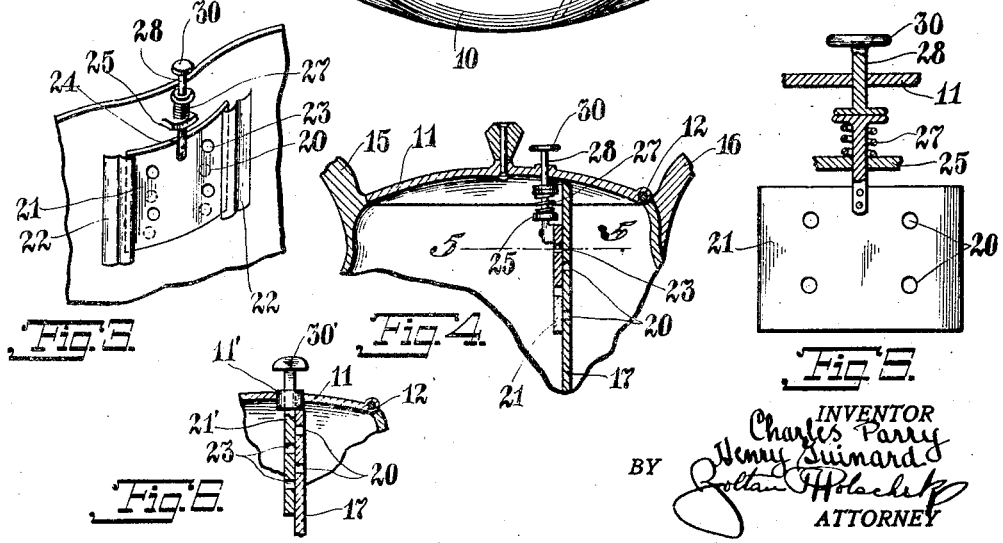
INVENTOR
Charles Parry
Henry Guinard
BY Zoltan Holecsek
ATTORNEY Patented Feb. 21, 1928.

1,660,174

UNITED STATES PATENT OFFICE.

CHARLES PARRY AND HENRY GUINARD, OF NEW YORK, N. Y.

TEAKETTLE.

Application filed June 29, 1927. Serial No. 202,184.

This invention relates to tea kettles, particularly to the class of kettles used on a table for serving purposes and has for one of its objects the provision of a compartment for retaining a solution of tea in water and an adjacent compartment for retaining hot water.

Another object of our invention is the provision of a tea kettle having separate compartments therein and separate discharge spouts communicating with said separate compartments.

A further object of our invention is the provision of a tea kettle having a partition therein and valve mechanism mounted on the partition for controlling the flow of liquid from one compartment to another.

Other objects and advantages will appear hereinafter, the novel features and combination being more clearly set forth in the appended claims.

In the drawing.

Fig. 1 is a central sectional view of a tea kettle embodying our invention.

Fig. 2 is a top plan view of the kettle shown in section in Fig. 1.

Fig. 3 is a fragmentary perspective view of the partition embodied in our invention and the valve mechanism mounted thereon.

Fig. 4 is a fragmentary vertical sectional view showing an additional development of our invention.

Fig. 5 is a sectional view taken on the line 5—5 of Fig. 4.

Fig. 6 is a similar view to Fig. 4 showing a further modification.

Referring particularly to Figs. 1 and 2 of the drawing, the numeral 10 is the body of a metal tea kettle, the numeral 11 designates the cover of the open end of said kettle, which is hinged to the body portion 10 at 12. The body portion 10 is substantially oval in section as shown in Fig. 2 and is provided with diametrically opposite discharge spouts 13 and 14 which communicate with the interior of the kettle. It should be understood that the kettle may comprise brass, copper, galvanized metal, stone ware or any suitable material. Handle members 15 and 16, preferably comprising nontransmissive material such as hardened rubber or wood, are attached at one extremity to the body portion 10 of the kettle and at their other extremities to the discharge spouts 13 and 14, respectively.

A partition 17 is disposed within the body portion 10 of the kettle and extends laterally from one side to the other thereof and vertically from the bottom of the kettle to the upper open end thereof. The partition 17, as shown in Figs. 1 and 2 is positioned to the left of the center of the kettle for providing a larger compartment 18 on the left hand side of the kettle than the compartment 19 on the right hand side thereof. As shown in Fig. 2, the partition 17 is curved outwardly to the left at its intermediate portion for providing a sufficiently large opening between the right hand side of the open extremity of the body portion 10 and the partition 17 to allow liquid to be conveniently poured into the compartment 19 from above when the cover 11 is in open position. Spaced apertures 20 may be provided at the top of the partition 17 for a purpose hereinafter disclosed.

In opeartion the compartment 18 is employed to retain a solution of water and tea, and the right compartment 19 is employed to retain heated water. The tea solution may be discharged through the spout 13 by tipping the spout 13 downwardly. This manipulation may be effected by gripping the right hand handle element 16. After the tea solution has been poured into a cup it is sometimes desirable to dilute the same with hot water. In order to effect this dilution conveniently without the necessity of employing two separate receptacles, the handle member 15 may be gripped and the spout 14 turned downwardly by tilting the kettle as above for pouring water from the compartment 19.

It should be understood that when the kettle is tilted to position the spout 13 downwardly some water will flow through the apertures 20 in the partition 17 into the compartment 18. At times this is desirable and at others it is not. Valve mechanism shown in Figs. 3, 4, and 5 comprising the plate 21 formed to fit the curvature of the partition 17 is slidably mounted on the left hand side of the partition by guide strips 22. The valve plate 21 is provided with apertures 23 adapted to register with the apertures 20 in the partition when the plate 21 is in a predetermined position and adapted to be out of registration with said apertures 20 when the plate 21 is in a different position.

A rod 24 is slidably mounted in a bracket 25 mounted on the partition 17 at one end and provided at its upper extremity with a head portion 26. A spring 27 is disposed around the rod 24 and positioned between the head 26 thereof and the bracket 25. The spring 27 is adapted to urge the head 26, rod 24 and plate 23 upwardly for normally retaining the apertures 23 in the plate 21 out of registration with the apertures 20 of the partition 22. A rod 28 is slidably mounted in the cover 11 of the kettle in registration with the rod 24 and is provided at its lower extremity with an enlargement 29 which is adapted to be engaged by the head 26 of the rod 24. It should be understood that the spring 27 serves to hold the rod 28 in an uppermost position and that the valve plate 21 may be moved downwardly against the action of the spring 27 by applying a downwardly directed force to the thumb button 30 mounted on the upper extremity of the rod 28. The downward movement of the valve plate 21 causes the apertures therein to be brought into registration with the apertures in the partition 17 for permitting liquid to flow through the partition. It should be further understood that when the thumb button is released the spring moves the valve plate 21 upwardly thus moving the apertures 23 out of registration with the apertures 20.

Having thus fully shown and described an embodiment of our invention what is desired to be secured by Letters Patent of the United States is:

1. A tea kettle of the class described comprising an outer casing, a partition having apertures in the upper end thereof mounted in said casing dividing the space therein into separate compartments, oppositely spaced spouts on said casing, each of said spouts being independently communicative with one of said compartments, spaced guide strips mounted on said partition, a valve plate slidably mounted between said guide strips having apertures therein adapted to be placed in registration with the apertures in said partition, a bracket having an aperture therein mounted on said partition above the apertures therein, a rod comprising an enlarged upper extremity slidably mounted in the aperture of said bracket and attached at its lower end to said plate and a spring disposed around said rod between the enlarged upper extremity thereof and said bracket for urging said rod and the plate attached thereto upwardly for normally retaining the apertures in said plate out of registration with the apertures in said partition preventing flow of liquid therethrough, said plate being adapted to be positioned for registering the apertures therein with the apertures in said partition for permitting liquid to flow therethrough from one compartment to the other.

2. A tea kettle of the class described comprising an outer casing having an open upper extremity, a cover pivotally attached to said casing adapted to close the upper open extremity thereof, a partition having apertures in the upper end thereof mounted in said casing dividing the space therein into separate compartments, oppositely spaced spouts on said casing, each of said spouts being communicative with one of said separate compartments, spaced guide strips mounted on said partition, a valve plate slidably mounted between said guide strips having apertures therein adapted to be placed in registration with the apertures in said partition, a bracket having an aperture therein mounted on said partition above the apertures therein, a rod comprising an enlarged upper extremity slidably mounted in the aperture of said bracket and attached at its lower end to said plate, a spring disposed around said rod between the enlarged upper extremity thereof and said bracket for urging said rod and the plate attached thereto upwardly for normally retaining the apertures in said plate out of registration with the apertures in said partition, a rod comprising an enlarged lower extremity slidably mounted in an aperture of the cover of said casing, the lower enlargement of said rod being disposed above the upper enlarged extremity of said first mentioned rod and in contact therewith, and a thumb button on the upper extremity of said second mentioned rod adapted to be forced downwardly together with said second mentioned rod and the plate attached thereto for bringing the apertures of said plate into registration with the apertures of said rod.

3. A tea kettle of the class described comprising an outer casing having an open extremity, a cover pivotally attached to said casing adapted to close the open extremity thereof, a partition having apertures in the upper end thereof mounted in said casing, valve mechanism mounted on said partition for normally closing said apertures and an actuating member slidably mounted through said cover and extended thereabove adapted to engage an extension of said valve mechanism for urging the same downwardly to uncover the apertures in said partition.

4. A tea kettle of the class described comprising an outer casing having an open extremity, a cover pivotally mounted on said casing for closing said open extremity, a partition in said casing having apertures therein, a valve plate having apertures therein slidably mounted on said partition, a spring associated with said valve plate for normally holding the same in a predetermined position, and an actuating member slidably mounted in an aperture in said cover adapted to engage an extension of said valve plate for moving the same against the action of said spring to another predetermined position.

5. A device of the class described comprising a casing, a cover mounted on said casing, a partition disposed within said casing having apertures therein, valve mechanism comprising a plate having apertures therein slidably mounted on said partition, a rod attached to said plate, a spring disposed around said rod adapted to urge said plate to a predetermined position, said plate being adapted to be moved to a different predetermined position against the action of said spring by manipulation of said rod when said cover is in open position, and an actuating member slidably mounted on said cover adapted to engage said rod for moving the same and the valve plate downwardly when said cover is in closed position.

In testimony whereof we have affixed our signatures.

CHARLES PARRY.
HENRY GUINARD.